(12) United States Patent
Khamesra et al.

(10) Patent No.: US 12,074,529 B2
(45) Date of Patent: Aug. 27, 2024

(54) VOLTAGE BUS DISCHARGE FOR UNIVERSAL SERIAL BUS POWER DELIVERY

(71) Applicant: Cypress Semiconductor Corporation, San Jose, CA (US)

(72) Inventors: Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 231 days.

(21) Appl. No.: 17/737,842

(22) Filed: May 5, 2022

(65) Prior Publication Data

US 2023/0361689 A1 Nov. 9, 2023

(51) Int. Cl.
*H02M 3/335* (2006.01)
*H02M 1/00* (2007.01)
*H02M 1/08* (2006.01)
*H02M 3/157* (2006.01)
*H02M 3/158* (2006.01)

(52) U.S. Cl.
CPC ......... *H02M 3/33592* (2013.01); *H02M 1/08* (2013.01); *H02M 3/157* (2013.01); *H02M 3/1582* (2013.01)

(58) Field of Classification Search
CPC ................. H02M 3/1582; H02M 3/33592
See application file for complete search history.

(56) References Cited

U.S. PATENT DOCUMENTS

| | | | | |
|---|---|---|---|---|
| 8,985,850 B1* | 3/2015 | Godbole | ................ | G01K 7/01 |
| | | | | 374/178 |
| 10,554,140 B1* | 2/2020 | Khamesra | ......... | H02M 3/33592 |
| 10,651,753 B1* | 5/2020 | Khamesra | ............... | H02M 7/06 |
| 10,651,754 B1* | 5/2020 | Murugesan | ....... | H02M 3/33523 |
| 10,693,384 B1* | 6/2020 | Mondal | ............. | H02M 3/33592 |
| 10,862,399 B1* | 12/2020 | Rai | ................... | H02M 3/33515 |
| 10,910,954 B1* | 2/2021 | Shah | ..................... | H01R 24/60 |
| 10,992,231 B1* | 4/2021 | Yang | ..................... | H02M 3/157 |
| 11,101,727 B1* | 8/2021 | Sharma | ................... | H02M 1/08 |
| 11,606,042 B1* | 3/2023 | Mondal | ............ | H02M 3/33515 |
| 11,811,324 B2* | 11/2023 | Zhang | ................ | H02M 3/1582 |
| 2016/0308452 A1* | 10/2016 | Motoki | ..................... | H02J 7/02 |
| 2018/0183340 A1* | 6/2018 | Waters | .................. | H02M 3/157 |

(Continued)

OTHER PUBLICATIONS

Texas Instruments, "TPS65994AE Dual Port USB Type-C@ and USB PD Controller with Integrated Source Power Switches", 64 pages, Jun. 2021.

*Primary Examiner* — Sisay G Tiku

(57) ABSTRACT

A secondary side controller for a flyback converter can include a synchronous rectifier (SR) gate driver pin coupled to a gate of an SR transistor on a secondary side of the flyback converter. An error amplifier is coupled to an output of a voltage bus of the flyback converter, the error amplifier to generate an error signal indicative of a voltage of the output of the voltage bus. Control logic is coupled to the error amplifier and to the SR transistor, the control logic to: detect when the voltage is at least a threshold percentage higher than a sink voltage required by a sink device coupled to the output of the voltage bus; detect assertion of a skip mode signal; and cause the SR transistor to be driven during a skip mode such as to partially discharge an output capacitor coupled to the output of the voltage bus.

20 Claims, 6 Drawing Sheets

(56) References Cited

U.S. PATENT DOCUMENTS

| | | | | |
|---|---|---|---|---|
| 2020/0412231 A1* | 12/2020 | Khamesra | ............... | H02M 1/32 |
| 2021/0058000 A1* | 2/2021 | Ahmed | .................... | H02J 7/00 |
| 2021/0184577 A1* | 6/2021 | Yang | .................. | H02M 3/1582 |
| 2022/0066980 A1* | 3/2022 | Khamesra | ........... | H02M 3/1552 |
| 2022/0069709 A1* | 3/2022 | Rai | ........................ | H02M 1/36 |
| 2022/0069710 A1* | 3/2022 | Vispute | .................. | H02M 1/08 |
| 2022/0069712 A1* | 3/2022 | Mondal | ............... | H02M 1/0009 |
| 2022/0069713 A1* | 3/2022 | Khamesra | ............... | H03F 3/183 |
| 2022/0069715 A1* | 3/2022 | Karri | ................... | H02M 1/0003 |
| 2022/0077784 A1* | 3/2022 | Zhang | ................ | H02M 1/0009 |
| 2023/0223858 A1* | 7/2023 | Shah | ................ | H02M 3/33523 |
| | | | | 363/21.03 |
| 2023/0231483 A1* | 7/2023 | Virunjipuram | ... | H02M 3/33592 |
| | | | | 363/21.14 |
| 2023/0299676 A1* | 9/2023 | Vispute | .................. | H02M 1/08 |
| | | | | 323/283 |
| 2023/0344213 A1* | 10/2023 | Khamesra | ............... | H02H 3/16 |
| 2023/0378877 A1* | 11/2023 | Karri | ................ | H02M 3/33592 |
| 2023/0387818 A1* | 11/2023 | Khamesra | ......... | H02M 3/33523 |
| 2023/0402914 A1* | 12/2023 | Rai | .................... | H02M 1/4258 |
| 2024/0048060 A1* | 2/2024 | Jose | .................... | H03K 17/691 |

\* cited by examiner

VOLTAGE BUS DISCHARGE FOR UNIVERSAL SERIAL BUS POWER DELIVERY

TECHNICAL FIELD

This disclosure relates to integrated circuits (ICs) that control Universal Serial Bus (USB) power delivery to electronic devices.

BACKGROUND

According to Universal Serial Bus (USB) power delivery (USB-PD) protocol, a power source application needs to meet certain timing specification with respect to a voltage bus (VBUS) movement. For example, in some cases, the VBUS is to go from a maximum voltage of say 21.5 volts (V) (or 28V for extended power range (EPR)) to a minimum voltage of say 3.3V during a programmable power supply (PPS) transition within 275 milliseconds (ms). Thus, sometimes a voltage converter has to discharge a VBUS output capacitor to not exceed a certain VBUS current, as a USB sink voltage requirement is reduced. Again, by way of example, for a VBUS cap of one ("1") millifarads (mF), a discharge of 24.5V in 275 ms corresponds to an average current of approximately 90 milliamps (mA). A 90 mA average current, however, would result in peak power dissipation of 2.5 watts (W) at 28V.

In general, an on-the-die VBUS discharge is resistive-type and takes a higher current at a higher VBUS voltage, resulting in even higher power dissipation. For higher thermal resistive packages like Small Outline Integrated Circuit (SOIC), Thin Shrink Small Outline Package (TSSOP), which are preferable over Quad Flat No-lead (QFN) due to assembly cost, a higher thermal resistivity (or theta-Ja) of 50-90° C./W results in a sudden increase in die temperature, causing a reliability risk due to a temperature reaching higher than 150° C. and as high as 225° C. or more. Thus, in certain USB Type-C interfaces, external power transistors are employed and controlled by USB controller using general purpose input/output (GPIO) signals, increasing area and costs of the USB device in order to deal with such a high temperature increase to protect the die on which the voltage converter controller(s) are located.

DETAILED DESCRIPTION

Figure 1:
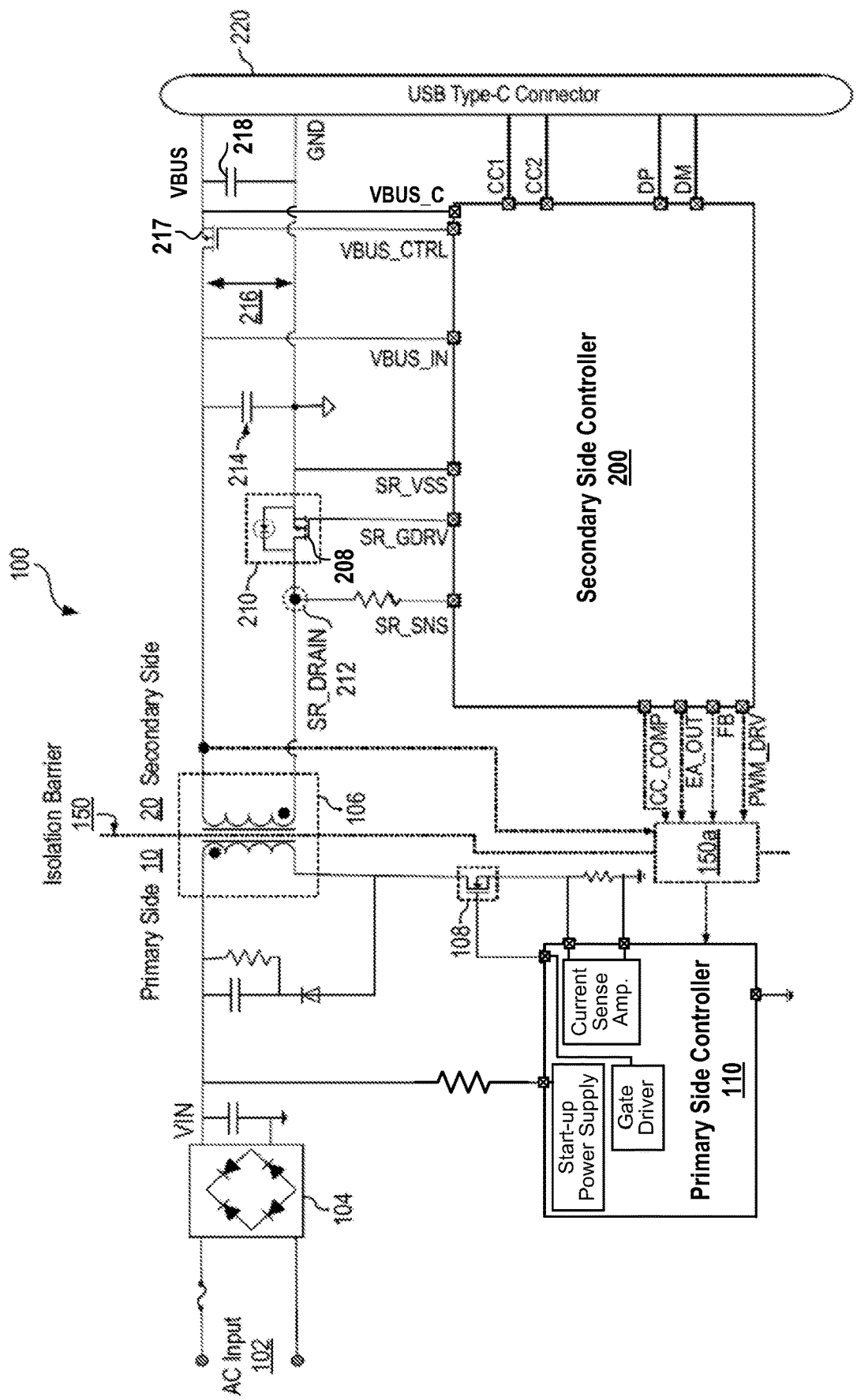
FIG. 1 is a schematic of a secondary-controlled alternating current (AC) to direct current (DC), or AC-DC converter system according to with an example embodiment.

The following description sets forth numerous specific details such as examples of specific systems, components, methods, and so forth, in order to provide a good understanding of various embodiments of voltage converters (both AC-DC and DC-DC types) with USB-PD controllers described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of voltage converters with USB-PD controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc.

In some embodiments, an AC-DC converter includes a secondary side controller and synchronous rectifier (SR) architecture that employs an SR gate driver pin coupled to a gate of an SR transistor on a voltage bus (VBUS) of a secondary side of a flyback converter. In other embodiments, a DC-DC converter includes an integrated circuit (IC) controller to control a buck-boost (BB) converter containing a first low-side transistor and a second high-side transistor that form a discharge path between an output of the VBUS and ground. In these various embodiments, the secondary side controller and the IC controller each include control logic that manages monitoring a voltage of an output of the VBUS in each of these voltage converters compared to a voltage demand by a sink device to which the USB device is coupled, and triggering partial discharge of an output capacitor of the VBUS based on this comparison. In this way, the control logic reduces the peak average current that the VBUS (or output terminal) might experience to control the thermal dissipation in higher thermal resistive packages.

More specifically, in at least some embodiments, the control logic detects if the voltage at the output of a voltage bus is at least a threshold percentage higher than a sink voltage required by a sink device coupled to the output of the voltage bus. The control logic can further detect assertion of a skip mode signal when the voltage converter is in skip mode, e.g., where no power is taken from the output and no power is supplied to the input of the voltage converter. The control logic can then, in the secondary side controller of the AC-DC converter, cause the SR transistor to be driven during a skip mode such as to partially discharge the output capacitor coupled to the output of the voltage bus. Or, the control logic can then, in the IC controller of the DC-DC converter, cause at least one of a first low-side driver or a second high-side driver to control at least one of the first low-side switch or the second high-side switch, respectively, during a skip mode such as to partially discharge an output capacitor coupled to an output terminal of the BB converter.

FIG. 1 is a secondary-controlled AC-DC converter 100, in accordance with some embodiments, which can also be referred to as a flyback converter system. The AC-DC converter 100 is a flyback AC-DC converter that provides galvanic isolation between the AC input 102 and the DC output 216. The AC-DC converter 100 includes a primary side 10 disposed on the AC input side of a flyback transformer 106, and a secondary side 20 disposed on the DC output side of the flyback transformer 106. An isolation barrier 150, with isolation element 150a, electrically isolates the primary side 10 from the secondary side 20.

In at least some embodiments, the primary side 10 of AC-DC converter 100 includes an AC input 102, a bridge rectifier 104, the flyback transformer 106, a primary power switch (PS) field-effect transistor (FET) 108, and a primary side controller 110. Further, the secondary side 20 includes a secondary side controller 200, a synchronous rectifier (SR) circuit 210 (e.g., an "SR"), a drain node (SR_DRAIN) 212, an output capacitor 214, and a Universal Serial Bus (USB) Type-C connector 220.

In various embodiments, on the primary side 10, the AC input 102 is configured to receive alternating current from a power source, e.g., such as a wall socket (not shown). The bridge rectifier 104 is coupled between an AC input 102 and the flyback transformer 106 to rectify the input voltage received at the AC input 102. The flyback transformer 106 is coupled to conduct the AC current from bridge rectifier 104, through its primary coil and the primary PS-FET 108, to ground. An input capacitor can be coupled to the output of the bridge rectifier 104 to be charged to an input voltage (Vin) into the primary side 10 of the AC-DC converter 100. In these embodiments, the primary side controller 110 is coupled to the gate of the primary PS-FET 108 to control the on and off cycles of flyback transformer 106.

In at least some embodiments, on the secondary side 20, the SR circuit 210 is coupled between the secondary coil of flyback transformer 106 and the output capacitor 214. The SR circuit 210 (also referred to herein as the "SR") includes a secondary PS-FET 208 (e.g., SR transistor) coupled in parallel to a diode, such that when the secondary PS-FET 208 is turned on, induction current flows to drain node 212. The SR circuit 210 is configured to charge the output capacitor 214 (in successive on and off cycles), so that the output capacitor 214 can provide a steady voltage to the DC output 216. The DC output 216 is coupled to the power connector 220. In these embodiments, the secondary side controller 200 is coupled to the drain node 212 of the SR circuit 210 to sense the voltage (and changes thereof) on the drain node. The secondary side controller 200 is also coupled to the gate of the secondary PS-FET 208 in the SR circuit 210 to turn the SR circuit 210 on and off (e.g., in respective on and off cycles) based on voltage peaks, negative voltage, and zero-voltage crossings sensed on the drain node 212.

In at least some embodiments, a feature that determines the efficiency of an AC-DC converter (e.g., such as the AC-DC converter 100) is the operation of the secondary PS-FET switch (e.g., the secondary PS-FET 208) that controls the operation cycles of the SR circuit 210. In primary-controlled mode, the secondary side controller 200 is dependent on the voltage level of the drain node (e.g., SR_DRAIN 212) of the SR circuit 210, as there is no other communication channel from the primary side 10 to the secondary side 20. In a typical operating scenario, the voltage on the SR_DRAIN node goes below less than 0V to indicate to the secondary side controller 200 to turn on the secondary PS-FET 208. When the voltage on the SR_DRAIN node reaches back to 0V, the secondary side controller 200 detects this zero-voltage crossing and turns off the secondary PS-FET 208.

With primary-side-controlled AC-DC converters, false negative sense (NSN) detection can be a problem for the secondary side controller 200 operating in the context of a primary-controlled AC-DC converter. Such false NSN detection happens during resonant ringing when the AC-DC converter 100 is operating in Discontinuous Conduction Mode (DCM). During such resonant ringing, the voltage on the SR_DRAIN node of the SR circuit 210 can get below <0V. This voltage can be wrongly interpreted by the secondary side controller 200 as a valid NSN detection event, causing the secondary side controller 200 to turn on the secondary PS-FET 208 of the SR circuit 210. This, in turn, results in efficiency loss due to the unnecessary turning on of the SR circuit 210, thereby discharging an output load capacitor 218, which carries the VBUS voltage (e.g., VBUS IN) to ground. In addition, if the primary side controller 110 turns on the primary PS-FET 108 at the same time, then cross-conduction will result with both the primary side 10 and the secondary side 20 being on at the same time. Such cross-conduction, however, can result in very high secondary-side current, which can cause breakdown of the diode and transistor components of the SR circuit 210. This problem can be resolved by a secondary-side-controlled AC-DC converter such as the AC-DC converter 100. The secondary side controller 200 generally ensures that the PS-FET 108 is turned off when the PS-FET 208 is turned on, and vice-versa, to prevent cross-conduction and to promote efficient operation.

In some embodiments, the secondary side 20 further includes an additional or secondary switch (SS) 217, such as an NFET, coupled between a third terminal of the flyback converter 106 and a positive DC output to enable to the secondary side controller 200 to turn off the DC output 216 to protect against over voltage and/or under voltage conditions and/or over current conditions and/or short circuit conditions. In some embodiments, such over voltage condition may trigger a skip mode, which will be discussed in more detail with reference to FIG. 2, in which the secondary side controller 200 prevents power from being released from the AC-DC converter 100, e.g., out of the VBUS. The SS 217 includes a drain node coupled to a voltage bus in pin ($V_{BUS\_IN}$) of the secondary side controller 200; a gate node coupled to a voltage bus control pin ($V_{BUS\_CTRL}$) to drive or control the SS 217; and a source node coupled to a voltage bus out pin ($V_{BUS\_C}$) and to the positive terminal of the DC output. Via the voltage bus out pin ($V_{BUS\_C}$), the secondary side controller 200 can monitor the USB Type-C VBUS voltage input (Vsink) that is being drawn by a sink device coupled to the USB Type-C connector 220.

Figure 2:
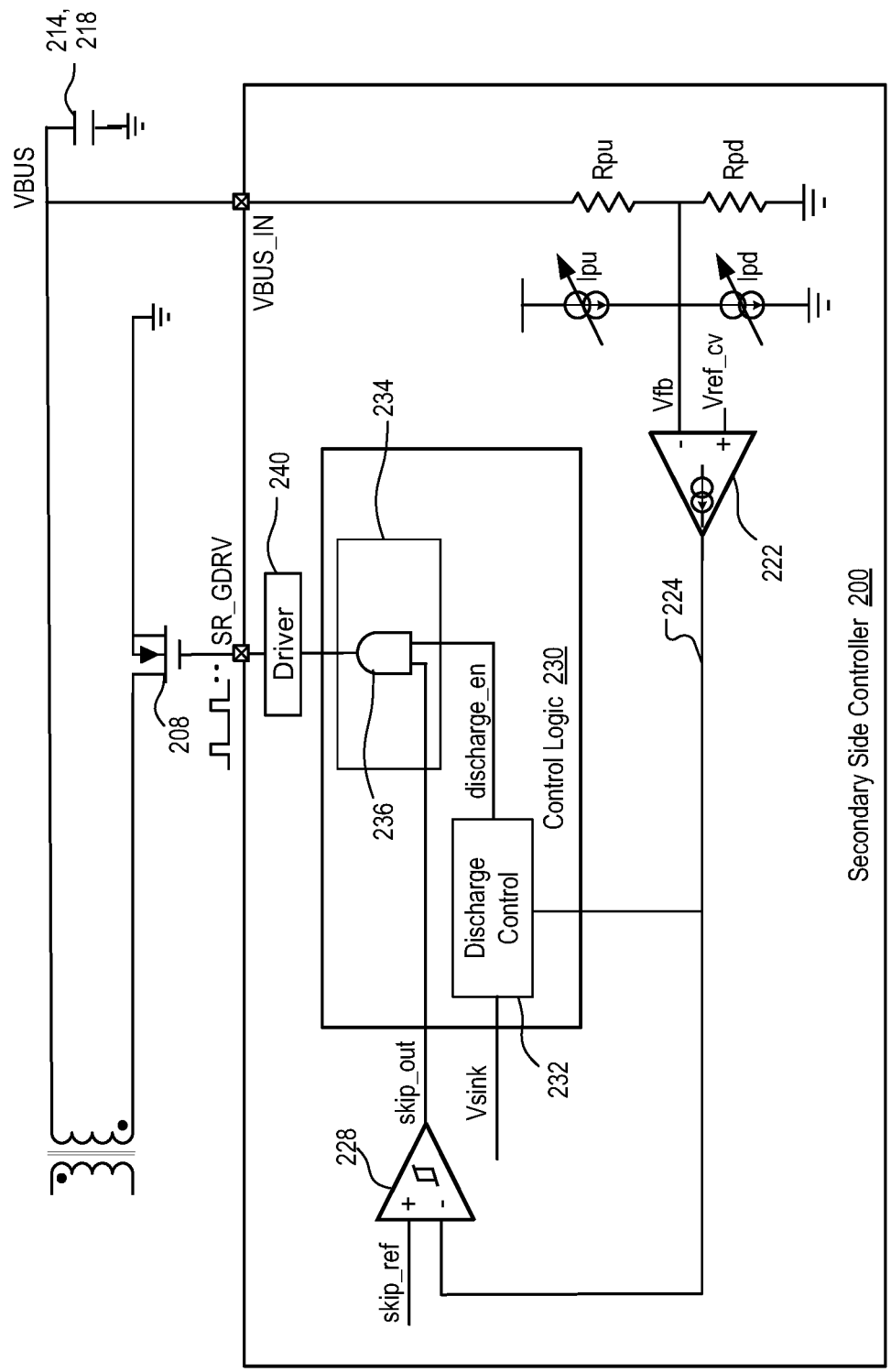
FIG. 2 is a simplified schematic block diagram of a secondary side controller of the AC-DC converter system of FIG. 1 according to at least one embodiment.

FIG. 2 is a simplified schematic block diagram of the secondary side controller 200 of the secondary-side-controlled AC-DC converter system 100 of FIG. 1 according to at least one embodiment. In these embodiments, secondary side controller 200 further includes an error amplifier (EA) 222, an EA signal 224, a skip mode comparator 228, control logic 230, and a gate driver 240.

In some embodiments, the EA 222 can be coupled to an output of a voltage bus (VBUS) of the flyback converter 100. The EA 222 can be configured to generate an error signal indicative of a voltage of the output of the voltage bus. More specifically, the EA 222 generates an EA signal 224 that is an amplification of an error value between the feedback VBUS voltage (Vfb) and a constant voltage reference voltage (Vref_cv), which is fixed or could be programmable.

In at least some embodiments, the skip comparator 228 compares the EA signal 224 to a skip reference voltage (skip_ref) and asserts a skip mode signal (skip_out) at an output of the skip mode comparator 228. The skip mode signal, when asserted, indicates that the AC-DC converter 100 is in a skip mode during which either no power is taken from the output or the capacitors 214, 218 are charged high enough to support output power. Further, when the skip mode signal is asserted, no power is supplied to the input of the AD-DC converter 100. While in skip mode, it is safe to perform partial discharge of one or more output capacitors coupled to the output of the VBUS, e.g., the output capacitor 214 and the output load capacitor 218.

In these embodiments, the control logic 230 includes a discharge controller 232 and an SR transistor controller 234. For example, the discharge controller 232 can detect, via comparing the VBUS IN signal to Vsink, that the VBUS voltage is at least a threshold percentage higher than a sink voltage (Vsink) required by a sink device (not shown) coupled to the output of the voltage bus. The "threshold percentage higher" can be a relatively low percentage such as 3 percent, 4 percent, 5 percent, 6 percent, 7 percent, or the like designed to keep the VBUS voltage from getting very much over the sink voltage. When making this detection, the discharge controller 232 can assert a discharge enable signal (discharge_en) to indicate to the SR controller 234 that the secondary PS-FET 208 (e.g., SR transistor) be turned on for a particular length of time periodically at a programmable, pre-defined frequency rate, to partially discharge the output capacitors. Thus, the control logic 230 can assert the discharge enable signal in response to detecting the voltage is at least the threshold percentage higher than the sink voltage.

Further, in at least some embodiments, the SR controller 234 includes an AND gate 236 to logically combine the skip mode signal and the discharge enable signal, e.g., so that the combined signal output from the AND gate 236 drives the SR transistor. Further, the gate driver 240 can be coupled between the control logic 230 and the SR gate driver pin (SR_GDRV). In these embodiments, the control logic 230 (e.g., the discharge controller 232) further controls assertion of the discharge enable signal such as to set a duty cycle and frequency of a gate driver signal that is output by the gate driver 240 to the SR gate driver pin. In at least some embodiments, the control logic 230 is programmed (e.g., via firmware or register transfer level (RTL) hardware instantiation) to control the duty cycle and frequency of the gate driver signal based on a size of the output capacitor(s). In some embodiments, the control logic 230 further adjusts (e.g., deasserts) a pulse width modulation drive signal (PWM_DRV) sent through the isolation element 150a to the primary side controller 110 to turn off the PS-FET 108, e.g., the primary power switch. In this way, the control logic 230 causes the primary power switch to be turned off during partial discharge of the output capacitor to avoid the aforementioned cross conduction.

In at least some embodiments, the control logic 230 (e.g., the discharge controller 232) is further to detect that the voltage has discharged to be at or less than the threshold percentage higher than the sink voltage. In response to such detection, the control logic 230 can deassert the discharge enable signal. Further, the skip mode comparator 228 might deassert the skip mode signal if the EA signal 224 moves sufficiently high in value. Whether the discharge enable signal or the skip mode signal is deasserted, the control logic 230 (e.g., the SR controller 234) terminates driving the gate driver 240 and the discharge period ends.

In this way, design of the secondary-side-controlled AC-DC controller 100 avoids the addition of power transistors and resistors external to the secondary side controller 200 along with avoiding at least one additional GPIO pin required to control such external transistors to perform the VBUS discharge that would otherwise be required when the VBUS voltage gets too high to avoid thermal heating within the die (chip). Reducing the need for these parts and additional pin(s) save on costs and design area. Further, a lower die cost of the secondary side controller 200 can be achieved, e.g., by also avoiding internal bulky resistors and/or FETs and no need of wider power/ground busses to support discharged current. Further, the disclosed design benefits from flexibility and programmability, e.g., based on the capacitance values of the one or more output capacitors and the inductance value of the secondary inductor of the flyback transformer 106, the control logic 230 can be programmed by varying pulse-width and frequency of the discharge enable signal (discharge_en).

Figure 3:
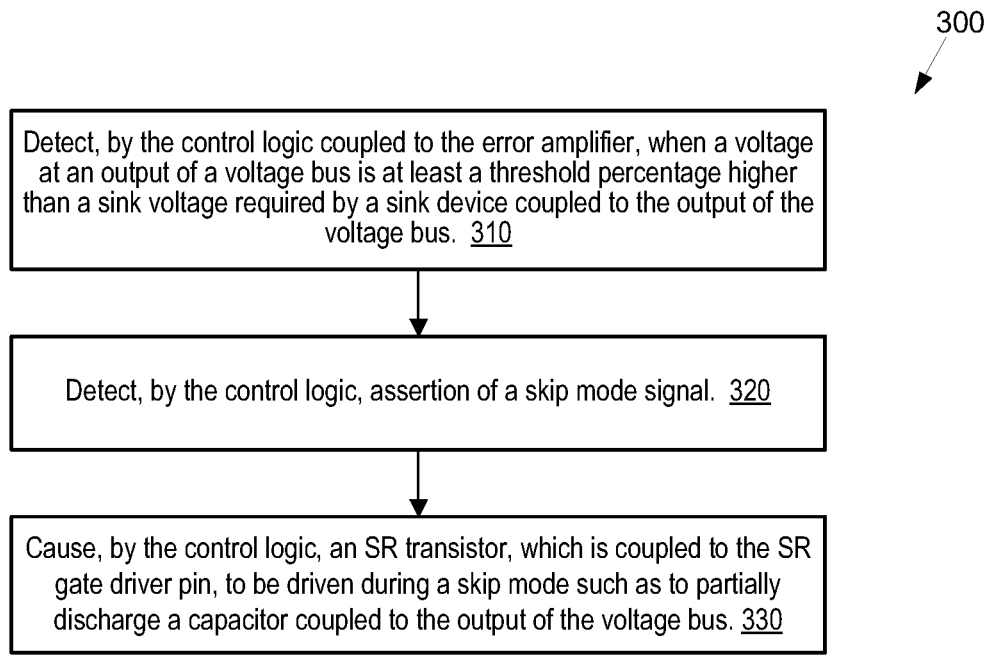
FIG. 3 is a flow diagram of a method of operating a secondary side controller for a flyback AC-DC converter according to at least one embodiment.

FIG. 3 is a flow diagram of a method 300 of operating a secondary side controller for a flyback, secondary-side-controlled AC-DC converter according to at least one embodiment. In these embodiments, the method 300 is performed by the secondary-side-controlled AC-DC converter 100 that employs the secondary side controller 200, which are illustrated and discussed with reference to FIGS.

1-2. In particular, the method 300 can employ firmware, logic, and circuit components of the secondary side controller 200, such as the control logic 230, which were discussed previously.

At operation 310, the control logic, which is coupled to the EA 222, detects when the VBUS voltage is at least a threshold percentage higher than a sink voltage (Vsink) required by a sink device coupled to the output of the voltage bus.

At operation 320, the control logic detects assertion of a skip mode signal, e.g., by the skip mode comparator 228.

At operation 330, the control logic causes the SR transistor (e.g., the secondary PS-FET 208) to be driven during a skip mode such as to partially discharge an output capacitor coupled to the output of the voltage bus. In these embodiments, the output capacitor can be either or both of the output capacitor 214 and the output load capacitor 218.

Figure 4:
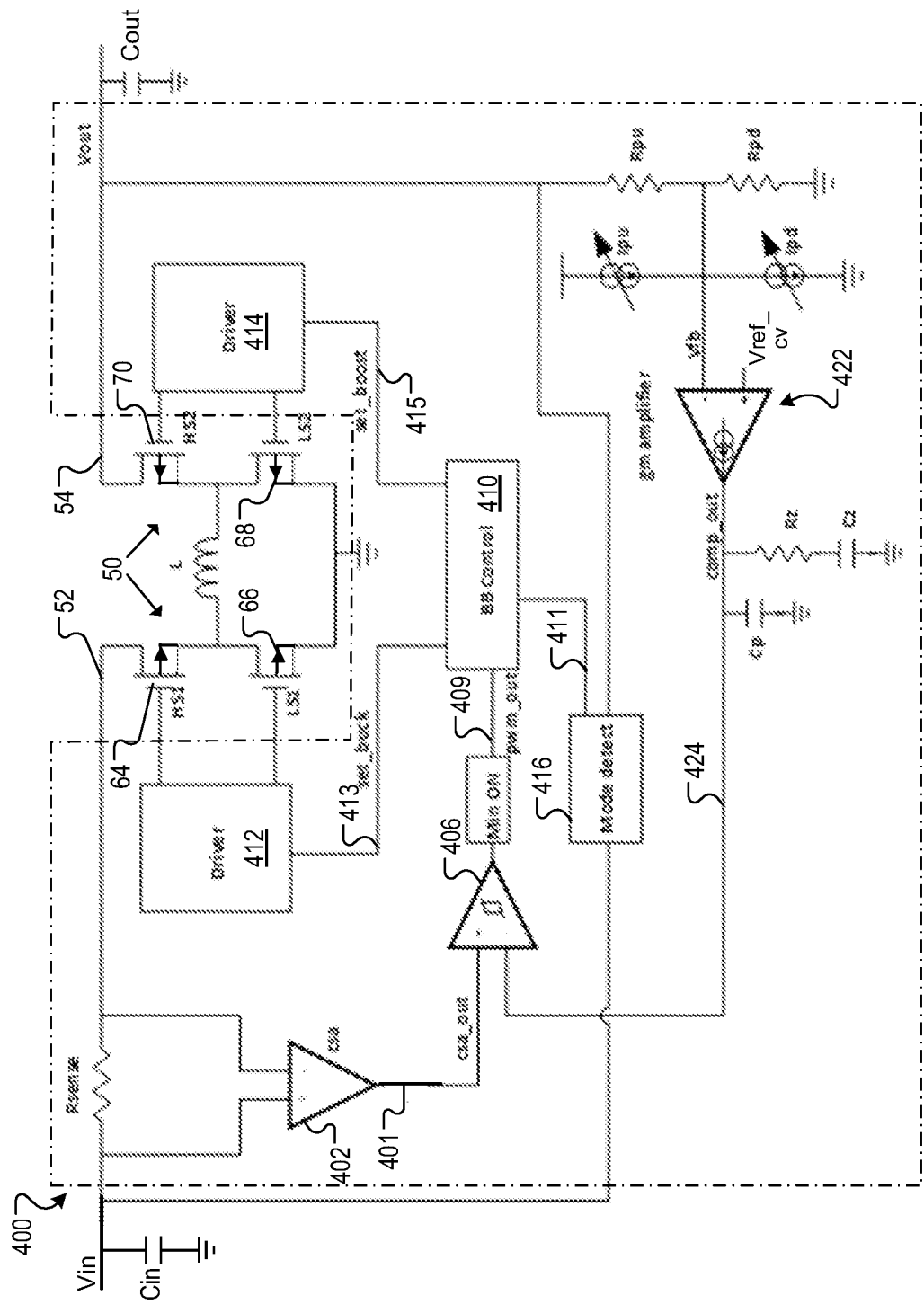
FIG. 4 is a schematic block diagram of a USB controller that includes a buck-boost converter in at least one embodiment.

FIG. 4 is a schematic block diagram of a USB controller 400 that includes, or is coupled to, a buck-boost (BB) converter 50 in at least one embodiment. In various embodiments, the BB converter 50 includes an inductor (L), a first high-side switch 64 (or HS1), a second high-side switch 70 (or HS2), a first low-side switch 66 (or LS1), and a second low-side switch 68 (or LS2). In one embodiment, these switches are n-type field effect transistors (NFETs), as illustrated. In another embodiment, although not illustrated, the high side switches are p-type field effect transistors (PFETs). In various embodiments, the first high-side switch 64 is coupled between an input terminal 52 and a first side of the inductor (L) of the buck-boost converter 50. The first high-side switch 64 is coupled between a second side of the inductor (L) and an output terminal 54. The first low-side switch 66 is coupled between the first side of the inductor (L) and a ground of the buck-boost converter 50. The second low-side switch 68 is coupled between the second side of the inductor (L) and the ground. The input terminal 52 can carry an input voltage (Vin) and the output terminal can carry an output voltage (Vout) of the BB converter 50. The output voltage can be similarly treated to the voltage bus (VBUS) of the AC-DC converter (FIGS. 1-2), but as provided at the output terminal 54 of the BB converter 50. The BB converter 50 can further include an input capacitor (Cin) coupled to the input terminal 52 and an output capacitor (Cout) coupled to the output terminal 54.

In various embodiments, the switches (HS1, HS2, LS1, LS2) can be controlled to operate the buck-boost converter 50 in one of four modes, including a buck mode, a BB buck mode, a BB boost mode, and a boost mode. Of these modes, performing a soft start of the BB converter 50 may only need to determine whether the buck-boost converter 50 is in buck mode or boost mode. For example, if the input voltage (Vin) is higher than the output voltage (Vout), the buck-boost converter 50 is in buck mode. In the buck mode, control logic can send pulses modulated to have a certain pulse width (PW) to intermittently turn on the first high-side switch 64, which builds current through the inductor (L) and ultimately builds the output voltage, Vout. Further, if Vout is higher than Vin, the buck-boost converter is in boost mode. In boost mode, the control logic can provide PW-modulated (PWM) signals to the second low-side switch 68. The frequency of the PWM signals can also be varied. Generally, with a high duty cycle of the PWM signals and the higher the frequency, the faster the energy will build in the inductor and the faster the voltage output (Vout) will build as well.

For such a BB converter 50, the input capacitor (Cin), output capacitor (Cout), and the inductor (L) can be designed based on input, output, and load current requirements. In various embodiments, the design of the BB converter 50 (or a larger system or device that includes the BB converter 50) seeks to limit the maximum current to a certain amperage and wattage requirement. Once total output power range is known, one can determine input current requirements. From input current requirements, one can determine values for capacitance of the input and output capacitors (Cin and Cout) and for the inductance of the inductor (L).

The USB controller 400 includes a current sense amplifier (CSA) 402, a comparator 406, an error amplifier (EA) 422, BB control logic 410, a buck side driver 412, a boost side driver 414, and mode detect logic 416. The CSA 402 can measure an input current of the buck-boost converter 50 and can output a CSA signal 401 indicative of the input current. In some embodiments, a slope compensation logic and hardware can act on the CSA signal 401 in order to add an offset signal to the CSA signal 401. Thus, the CSA signal 401 includes a slope compensation offset voltage or charge in some embodiments.

In at least one embodiment, the comparator 406 receives the CSA signal 401 and an EA signal 424 from the EA 422. The EA 422 compares the output voltage (Vout) against a constant voltage reference voltage (Vref_cv) to generate an EA signal 424. The comparator 406 compares the CSA signal 401 and the EA signal 424 and provides a control signal 409, referred to as pulse width modulation (PWM) out (or pwm_out) signal, to the BB control logic 410. In one embodiment, an EA control loop refers to at least the EA 422, the CSA 402, and the comparator 406 that adjust the PWM output signal to the BB control 410 based on the input voltage (Vin), the output voltage (Vout), and the reference voltage (Vref_cv), the latter of which is programmable.

In various embodiments, the BB control logic 410 receives the control signal 409 and a mode signal 411 from mode detect logic 416. The mode detect logic 416 can determine a mode and a transition between modes based on the output voltage (Vout) and the input voltage (Vin), and outputs the mode signal 411 accordingly. As discussed, if Vin is higher than Vout, the mode detect logic 416 will output the mode signal 411 indicative of buck mode. In contrast, if Vout is higher than Vin, the mode detect logic 416 will output the mode signal 411 indicative of boost mode.

The BB control logic 410 can use the control signal 409 and the mode signal 411 to control a mode of the buck-boost converter 50. In particular, the BB control logic 410 can send a first control signal 413 (set buck) to the buck side driver 412 that controls the first high-side switch 64 and the first low-side switch 66 of the buck-boost converter 50. The BB control logic 410 can further send a second control signal 415 (set boost) to the boost side driver 414 that controls the second high-side switch 70 and the second low-side switch 68 of the buck-boost converter 50.

Figure 5:
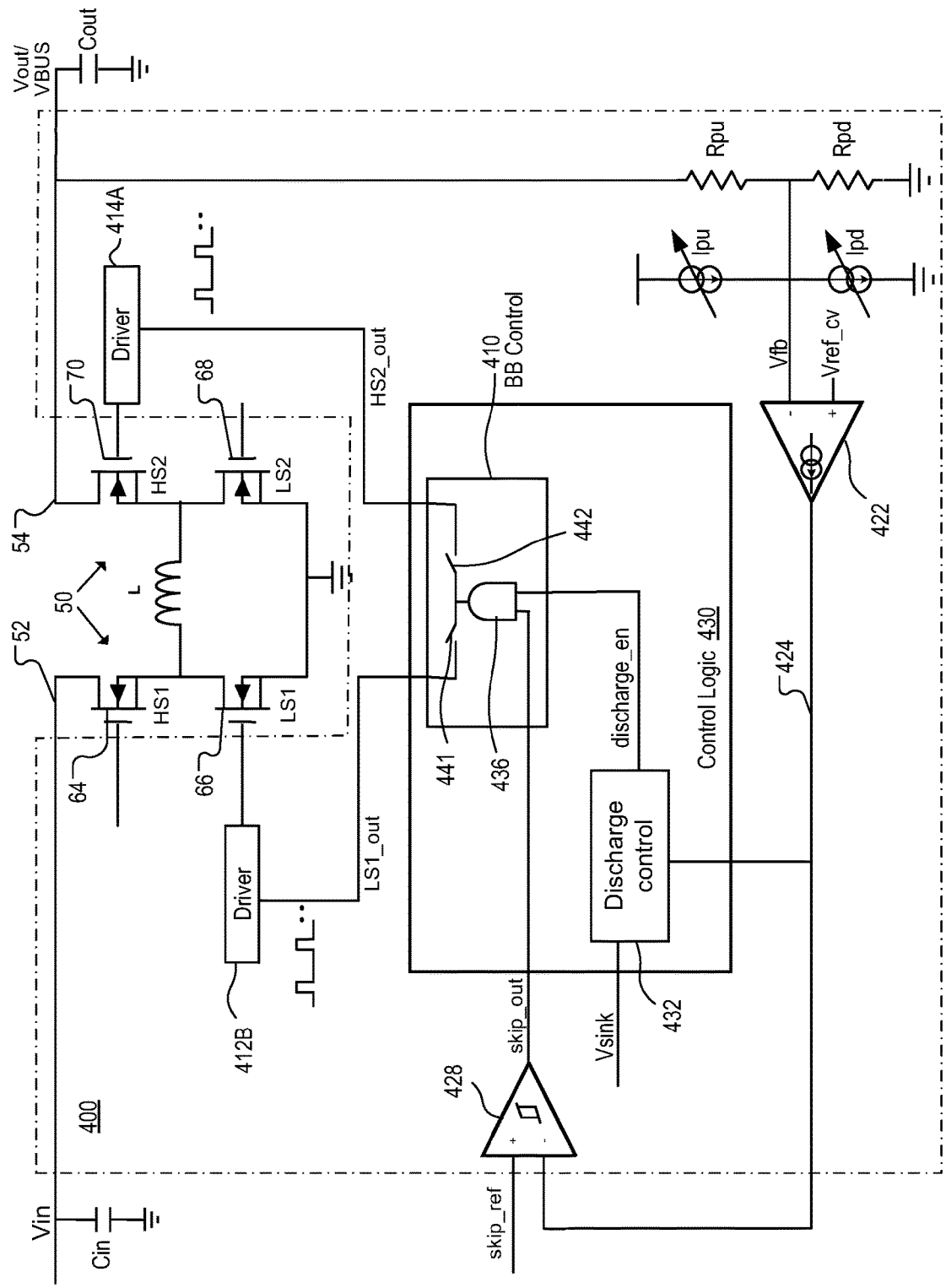
FIG. 5 is a simplified schematic block diagram of the USB controller of FIG. 4 according to at least one embodiment.

FIG. 5 is a simplified schematic block diagram of the USB controller 400 of FIG. 4 according to at least one embodiment. In some embodiments, the USB controller 400 is an integrated circuit (IC) controller manufactured as a chip on a die, for example. In at least some embodiments, the USB controller 400 is designed for a non-forced continuous conduction mode (non-FCCM) converter, where the non-FCCM converter includes the buck-boost (BB) converter 50, as was discussed with reference to FIG. 4.

With additional reference to FIG. 4, in at least some embodiments, the driver 412 includes a first low-side driver 412B to drive the first low-side switch 66 that is coupled between the inductor (L) and ground of the BB converter 50.

Further, the driver 414 includes a second high-side driver 414A to drive the second high-side switch 70 that is coupled between the inductor (L) and the output terminal 54 of the BB converter 50. For example, the second high-side switch 70 and the first low-side switch 66 form a controllable path between the output capacitor (Cout) and ground of the BB controller 50, e.g., that defines a discharge path. In at least some embodiments, the USB controller 400 further includes a skip mode comparator 428 and control logic 430, which in turn includes the BB control logic 410 and a discharge controller 432.

In some embodiments, the EA 422 can be coupled to an output of the output terminal 54, which provides an output voltage from a voltage bus (VBUS) of the BB converter 50. The EA 422 can be configured to generate an error signal indicative of a voltage of the output terminal 54 of the BB converter 50. More specifically, the EA 422 generates an EA signal 424 that is an amplification of an error value between the feedback VBUS voltage (Vfb) and a constant voltage reference voltage (Vref_cv). In some embodiments, the reference voltage is the Type-C VBUS voltage input (Vsink) received at the voltage bus out pin ($V_{BUS\_C}$) of the USB controller 400.

In at least some embodiments, the skip comparator 428 compares the EA signal 424 to a skip reference voltage (skip_ref) and asserts a skip mode signal (skip_out) at an output of the skip mode comparator 428. The skip mode signal, when asserted, indicates that the USB controller 400 is in a skip mode during which either no power is taken from the output or VBUS capacitor Cout is charged high enough to support output power. Further, when the skip mode signal is asserted, no power is supplied from the input of the BB converter 50. While in skip mode, it is safe to perform partial discharge of output capacitor (Cout) coupled to the output terminal 54 of the BB converter 50.

In at least some embodiments, the discharge controller 432 detects, via comparing the VBUS voltage to Vsink, that the voltage on the output capacitor (e.g., Vout or VBUS) is at least a threshold percentage higher than a sink voltage (Vsink) required by a sink device (not shown) coupled to the output terminal 54. When making this detection, the discharge controller 432 can assert a discharge enable signal (discharge_en) to indicate to the BB control logic 410 that the first low-side switch 66 and the second high-side switch 70 be turned on for a particular length of time periodically at a programmable, pre-defined frequency rate, to partially discharge the output capacitor.

Further, in at least some embodiments, the BB control logic 410 includes an AND gate 436 to logically combine the skip mode signal and the discharge enable signal, e.g., so that the combined signal output from the AND gate 436 actuates both of the first low-side driver 412B and the second high-side driver 414A. In these embodiments, the control logic 430 (e.g., the discharge controller 432) further controls assertion of the discharge enable signal such as to set a duty cycle and frequency of a gate driver signal that is output by each of the first low-side gate driver 412B and the second high-side gate driver 414A. In at least some embodiments, the control logic is programmed (e.g., via firmware or register transfer level (RTL) hardware instantiation) to control the duty cycle and frequency of the gate driver signal based on a size of the output capacitor (Cout).

In some embodiments, a BB control logic 410 further includes a first switch 441 that is selectively coupled between the AND gate 436 and the first low-side gate driver 412B. In these embodiments, the BB control logic 410 further includes a second switch that is selectively coupled between the AND gate 436 and the second high-side gate drier 414A. In these embodiments, if the BB converter 50 is a buck-only BB converter, where the HS2 second high-side switch 70 is permanently on or bypassed and the LS2 or second low-side switch 68 is permanently disabled or not present, the control logic 430 causes just the first low-side driver 412B to control the first low-side switch 66 to partially discharge the output capacitor. Thus, the BB control logic 410 may close the first switch 441 and open the second switch 442. In other embodiments, the BB converter 50 is a boost-only BB converter, where HS1 or the first high-side switch 64 is permanently on or bypassed and the LS1 or first low-side switch 66 is permanently disabled or not present, and the control logic 430 may cause just the second high-side driver 414A to control the second high-side switch 70 to partially discharge the output capacitor. Thus, the BB control logic 410 may open the first switch 441 and close the second switch 442. In these embodiments, if the BB converter 50 is a buck-boost BB converter, where all four switches HS1, HS2, LS1, and LS2 are present and controlled by the BB converter 50, the control logic 430 causes the first low-side driver 412B to control the first low-side switch 66 and the second high-side driver 414A to control the second high-side switch 70 to partially discharge the output capacitor. Thus, the BB control logic 410 may close the first switch 441 and close the second switch 442 simultaneously.

In at least some embodiments, the control logic 430 is programmed (e.g., via firmware or register transfer level (RTL) hardware instantiation) to control the duty cycle and frequency of the gate driver signal based on a size of the output capacitor. In at least some embodiments, the control logic 430 (e.g., the discharge controller 432) is further to detect that the voltage has discharged to be at or less than the threshold percentage higher than the sink voltage. In response to such detection, the control logic 430 can deassert the discharge enable signal. Further, the skip mode comparator 428 might deassert the skip mode signal if the EA signal 424 moves sufficiently high in value. Whether the discharge enable signal or the skip mode signal is deasserted, the control logic 430 terminates driving the first low-side gate driver 412B and the second high-side gate driver 414A and the discharge period ends.

In this way, design of the USB controller 400 avoids the addition of power transistors and resistors external to the IC controller along with avoiding at least one additional GPIO pin required to control such external transistors to perform the VBUS or Vout discharge that would otherwise be required when the output voltage gets too high to avoid thermal heating within the die (chip). Reducing the need for these parts and additional pin(s) save on costs and design area. Further, a lower die cost of the IC controller can be achieved, e.g., by also avoiding internal bulky resistors and/or FETs and no need of more wider power/ground busses to support discharged current. Further, the disclosed design benefits from flexibility and programmability, e.g., based on the capacitance value of the output capacitor and the inductance value of the inductor (L) of the BB converter 50, the control logic 430 can be programmed by varying pulse-width and frequency of the discharge enable signal (discharge_en).

Figure 6:
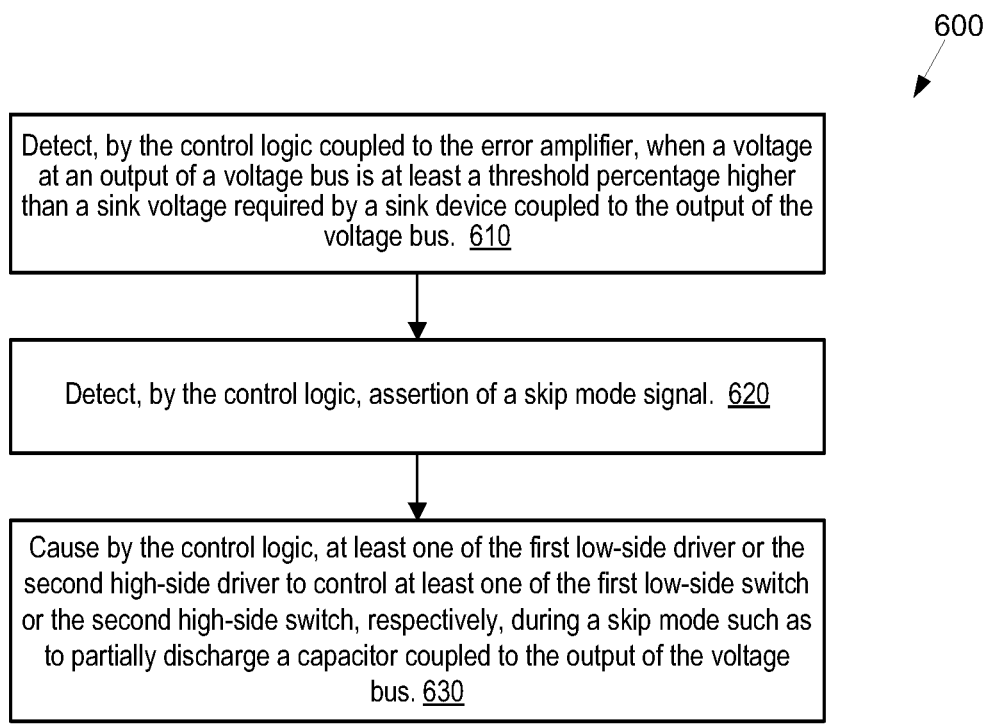
FIG. 6 is a flow diagram of a method of operating a DC-to-DC USB controller according to at least one embodiment.

FIG. 6 is a flow diagram of a method 600 of operating a DC-to-DC USB controller according to at least one embodiment. In these embodiments, the method 600 is performed by such as the USB controller 400 that is illustrated and discussed with reference to FIGS. 4-5. In particular, the method 600 can employ firmware, logic, and circuit components of the USB controller 400, such as the control logic 430, which were discussed previously.

At operation 610, the control logic, which is coupled to the EA 422, detects when the voltage at the output terminal 54 is at least a threshold percentage higher than a sink voltage (Vsink) required by a sink device coupled to the output terminal 54.

At operation 620, the control logic detects assertion of a skip mode signal, e.g., by the skip mode comparator 228.

At operation 630, the control logic causes at least one of the first low-side driver 412B and/or the second high-side driver 414A to control at least one of the first low-side switch 66 and/or the second high-side switch 70, respectively, during a skip mode such as to partially discharge the output capacitor (Cout) coupled to the output terminal 54.

Various embodiments of voltage bus discharge for USB-C/PD described herein may include various operations. These operations may be performed and/or controlled by hardware components, digital hardware and/or firmware, and/or combinations thereof. As used herein, the term "coupled to" may mean connected directly to or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A secondary side controller for a flyback converter, the secondary side controller comprising an integrated circuit (IC) that comprises:
   a synchronous rectifier (SR) gate driver pin coupled to a gate of an SR transistor on a secondary side of the flyback converter;
   an error amplifier coupled to an output of a voltage bus of the flyback converter, the error amplifier to generate an error signal indicative of an output voltage of the output of the voltage bus; and
   control logic coupled to the error amplifier and to the SR transistor, the control logic to:
      detect when the output voltage is at least a threshold percentage higher than a sink voltage required by a sink device coupled to the output of the voltage bus;
      detect assertion of a skip mode signal indicating that power is not supplied to an input of the flyback converter; and
      cause, to reduce peak average current over the voltage bus, the SR transistor to be driven during a skip mode such as to partially discharge an output capacitor coupled to the output of the voltage bus.

2. The secondary side controller of claim 1, wherein the control logic is further to cause a primary power switch to be turned off during the partial discharge of the output capacitor.

3. The secondary side controller of claim 1, wherein the control logic is further to assert a discharge enable signal in response to detecting that the output voltage is at least the threshold percentage higher than the sink voltage.

4. The secondary side controller of claim 3, wherein the control logic comprises an AND gate to logically combine the skip mode signal and the discharge enable signal, wherein the combined signal is to drive the SR transistor.

5. The secondary side controller of claim 3, further comprising a gate driver coupled between the control logic and the SR gate driver pin, wherein the control logic is further to control assertion of the discharge enable signal such as to set a duty cycle and frequency of a gate driver signal that is output by the gate driver to the SR gate driver pin.

6. The secondary side controller of claim 5, wherein the control logic is programmed to control the duty cycle and frequency of the gate driver signal based on a size of the output capacitor.

7. The secondary side controller of claim 3, wherein the control logic is further to:
   detect at least one of the skip mode signal being deasserted or that the output voltage has discharged to be at or less than the threshold percentage higher than the sink voltage; and
   deassert the discharge enable signal.

8. An integrated circuit (IC) controller for a non-forced continuous conduction mode (non-FCCM) converter of a Universal Serial Bus (USB) Type-C device, the non-FCCM converter comprising a buck-boost (BB) converter, wherein the IC controller comprises:
   a first low-side driver to drive a first low-side switch that is coupled between an inductor and ground of the BB converter;
   a second high-side driver to drive a second high-side switch that is coupled between the inductor and an output terminal of the BB converter;

an error amplifier coupled to the output terminal, the error amplifier to generate an error signal indicative of an output voltage provided at the output terminal of the BB converter; and control logic coupled to the error amplifier, the first low-side driver, and the second high-side driver, wherein the control logic is to:

detect when the output voltage is at least a threshold percentage higher than a sink voltage required by a sink device coupled to the output terminal;

detect assertion of a skip mode signal; and cause, to reduce peak average current over the output terminal, at least one of the first low-side driver or the second high-side driver to control at least one of the first low-side switch or the second high-side switch, respectively, during a skip mode such as to partially discharge an output capacitor coupled to the output terminal.

9. The IC controller of claim 8, wherein the BB converter is a buck-only BB converter, and wherein the control logic is to cause the first low-side driver to control the first low-side switch to cause the partial discharge the output capacitor.

10. The IC controller of claim 8, wherein the BB converter is a boost-only BB converter, and wherein the control logic is to cause the second high-side driver to control the second high-side switch to cause the partial discharge the output capacitor.

11. The IC controller of claim 8, wherein the control logic is further to assert a discharge enable signal in response to detecting that the output voltage is at least the threshold percentage higher than the sink voltage.

12. The IC controller of claim 11, wherein the control logic comprises an AND gate to logically combine the skip mode signal and the discharge enable signal, wherein the combined signal is to actuate the at least one of the first low-side driver or the second high-side driver.

13. The IC controller of claim 11, wherein the control logic is further to control assertion of the discharge enable signal such as to set a duty cycle and frequency of a gate driver signal that is output by the at least one of the first low-side driver or the second high-side driver.

14. The IC controller of claim 13, wherein the control logic is programmed to control the duty cycle and frequency of the gate driver signal based on a size of the output capacitor.

15. The IC controller of claim 11, wherein the control logic is further to:

detect at least one of the skip mode signal being deasserted or that the output voltage has discharged to be at or less than the threshold percentage higher than the sink voltage; and deassert the discharge enable signal.

16. A method of operating an integrated circuit (IC) of an secondary side controller for a flyback converter, the IC comprising a synchronous rectifier (SR) gate driver pin, an error amplifier, and control logic, wherein the method of operating the IC comprises:

detecting, by the control logic coupled to the error amplifier, when output voltage at an output of a voltage bus is at least a threshold percentage higher than a sink voltage required by a sink device coupled to the output of the voltage bus;

detecting, by the control logic, assertion of a skip mode signal indicating that power is not supplied to an input of the flyback converter; and causing, by the control logic, an SR transistor, which is coupled to the SR gate driver pin, to be driven during a skip mode such as to partially discharge an output capacitor coupled to the output of the voltage bus to reduce peak average current over the voltage bus.

17. The method of claim 16, further comprising asserting, by the control logic, a discharge enable signal in response to detecting that the output voltage is at least the threshold percentage higher than the sink voltage.

18. The method of claim 17, further comprising:

combining, by the control logic, the skip mode signal and the discharge enable signal; and driving, with the combined signal, the SR transistor.

19. The method of claim 17, wherein the IC further comprises a gate driver coupled between the control logic and the SR gate driver pin, wherein asserting the discharge enable signal comprises setting a duty cycle and frequency of a gate driver signal that is output by the gate driver to the SR gate driver pin.

20. The method of claim 17, further comprising:

detecting at least one of the skip mode signal being deasserted or that the output voltage has discharged to be at or less than the threshold percentage higher than the sink voltage; and deasserting the discharge enable signal.

* * * * *